United States Patent

[11] 3,526,179

| [72] | Inventor | Mitsutoshi Ogiso<br>Kawasaki, Japan |
|---|---|---|
| [21] | Appl. No. | 645,935 |
| [22] | Filed | June 14, 1967 |
| [45] | Patented | Sept. 1, 1970 |
| [73] | Assignee | Canon Camera Kabushiki Kaisha<br>Tokyo, Japan<br>a corporation of Japan |
| [32] | Priority | June 20, 1966, Oct. 13, 1966, Oct. 13, 1966 |
| [33] | | Japan |
| [31] | | Nos. 41/58183, 41/95575 and 41/95576 |

[54] CAMERA HAVING AN INDICATING MEANS FOR FLASH PHOTOGRAPHY
4 Claims, 3 Drawing Figs.

[52] U.S. Cl. ................................................ 95/11.5
[51] Int. Cl. ................................................ G03b 9/70
[50] Field of Search ......................................... 95/11,
11(Lamp), 11.5; 240/1.3; 431/93, 95;
315/241; 324/(Inquired)

[56] References Cited
UNITED STATES PATENTS

| 2,911,809 | 11/1959 | Nojiri .......................... | 240/1.3 |
| 3,374,718 | 3/1968 | Hochreiter .................. | 95/11.5X |

*Primary Examiner* — Norton Ansher
*Assistant Examiner* — Fred L. Braun
*Attorney* — Marn and Jangarathis ABSTRACT: A camera having an indicator device for carrying out a plurality of inspections for a photographic flash unit with a single indicator lamp. The camera has a built-in flash unit including a detection circuit with an indicator switch, an indicator lamp, and a selector switch which may be set for daylight or flash photography. The indicator lamp is connected in series with the selector switch and will indicate whether or not the selector switch has been properly set for flash illumination when the indicator switch is actuated. The flash unit also has an impedance element which may be selectively connected into the circuit with the indicator lamp by a third switch member to indicate whether or not the flash bulb has been properly placed into the socket for flash illumination. The indicator switch may be interconnected with the shutter release of the camera and is actuated in response to initial movement of the shutter release.

Patented Sept. 1, 1970 3,526,179

INVENTOR.
MITSUTOSHI OGISO
BY

CAMERA HAVING AN INDICATING MEANS FOR FLASH PHOTOGRAPHY

The present invention relates to a camera having indicator means for carrying out a plurality of inspections with a single indicator lamp in connection with flash-photography.

There have hitherto been known cameras containing a flash-illuminator within the camera body. In these conventional cameras, a cameraman can know whether to use ordinary photography or flash-photography, and according to the indicated instruction can take the picture with the proper exposure. When the brightness of the object is low, the cameraman must insert a flash bulb in the flash-illuminator, but when the bulb is not inserted properly, the bulb is defective or the battery is dead, the bulb does not flash, and the exposure is unsuccessful.

In carrying out flash-photography, a flash bulb is inserted into the built-in flash-illuminator, and at the same time, the elements for determining the exposure of the camera must be manually set for flash photography, i.e. the shutter speed should be determined in considering the illumination characteristics of the particular flash bulb used, and the aperture stop should be set considering the film sensitivity, the film guide number and the distance from the object to be photographed. However, a cameraman is apt to forget these operations because he is in a hurry, and as a result thereof, the exposure is unsuccessful.

An object of the present invention is to provide a camera having indicator means for checking insertion of the bulb into the bulb socket of the flash-illuminator, for checking the flash bulb circuit, and for indicating when the object is too dark for ordinary photography and use of a flash bulb is necessary.

Another object of the present invention is to provide a camera having a single indicator means for carrying out all of the above-mentioned checking and indicating functions.

Various other objects and advantages of the invention will become clear from the following detailed description of several embodiments thereof, and the novel features will be particularly pointed out in connection with the appended claims. These embodiments will be described with reference to the accompanying drawings, wherein:

Figure 1:
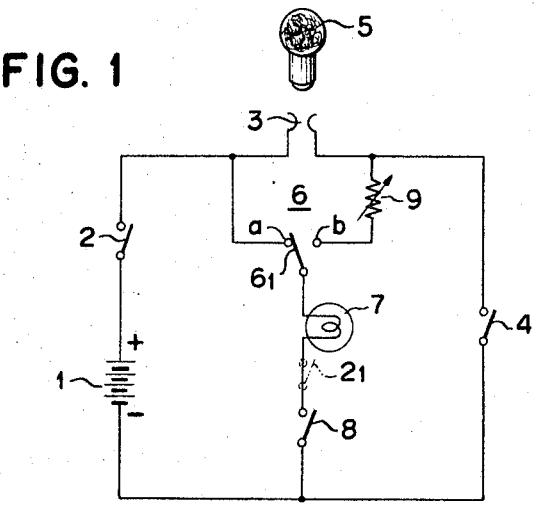
FIG. 1 is a circuit diagram showing a first embodiment of the indicator means of the camera of the present invention.

With reference to FIG. 1, the reference numerals indicate the following circuit elements, operation of which is described below.

1 is a suitable electric source or battery for flashing,
2 is a single pole switch for the battery,
3 is a flash bulb socket,
4 is a single pole switch synchronized with the shutter,
5 is a flash bulb,
6 is a double pole switch connected in parallel to socket 3,
7 is an indicating lamp,
8 is a switch, which is set to be on interlocked with the manual operation of the known auto-flash mechanism (not shown for clearly showing the invention) to set it to flash-photography which in turn automatically sets the exposure system of the camera (the shutter speed and/or aperture stop) to an appropriate value for flash-photography according to a distance to the object from the camera, and
9 is an optional movable resistance to prevent setting off the flash bulb prematurely.

Operation of this embodiment is carried out as follows:

When flash auto-switch 8 is closed, the exposure system of the camera is set. When the shutter release button (not shown) is pushed down by one increment, battery switch 2 is closed, the circuit $1(+)-2-6(a)-6_1-7-8-1$ $(-)$ is closed, and lamp 7 is lit, indicating that the camera is switched over to flash-photography. When the movable contact $6_1$ of switch 6 is switched over to the $b$ side, the circuit $1 (+)-2-3-5-9-6(b)-6_1-7-8-1$ $(-)$ is closed and lamp 7 is illuminated to indicate that the flash bulb is properly inserted and ready to be flashed. In this case, the electric current passing through this circuit is controlled so as not to have flash bulb 5 set off by the variable resistance 9, or, by suitably selecting the internal resistance of the lamp 7. The movement of contact $6_1$ from the $a$ position to the $b$ position may be accomplished by the insertion of flash bulb 5 into socket 3, by a further incremental movement of the shutter release button or by an independent action.

When the shutter release button is pushed a further increment, the shutter synchronized contact 4 is closed, and the flash bulb 5 is flashed. However, switches 4 and 8 are interlocked so that switch 4 is not closed when switch 8 is open.

When the camera is not switched for flash-photography, switch 8 is open, and lamp 7 is not lit. When switch 8 is closed and lamp 7 does not light with the first movement of the shutter release, it is immediately known that either battery 1 or lamp 7 is not working, but it will only be the latter in rare instances. If lamp 7 does not light after switch 6 is moved to the $b$ position, it is known that either the bulb is faulty or that it has not been inserted properly. The flash circuit is thus completely checked before synchronized switch 4 is closed and the flash bulb is set off. When battery switch 2 is series connected to lamp 7 at the position $2_1$ (shown in dotted lines), there is no fear that a poor contact will break the circuit, because there is nothing other than synchronized contact 4 in the flash circuit. On the other hand, the contact resistance of the circuit is only that of synchronized contact 4, and therefore the time to peak of bulb 5 may be changed.

Figure 2:
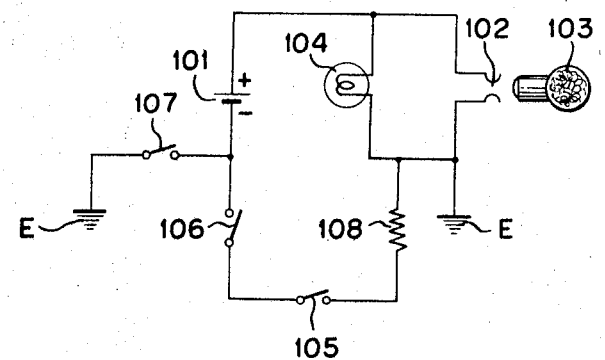
FIG. 2 is a circuit diagram showing a second embodiment of the indicator means of the camera of the present invention.

The second embodiment of the invention is shown in FIG. 2, and contains the following circuit elements:

101 is a flash bulb illuminating battery or other electric source;
102 is a flash bulb socket;
103 is a flash bulb;
104 is an indicator lamp connected in parallel to flash bulb 103;
105 is a flash auto-switch;
106 is a main switch;
107 is a shutter synchronized switch; and
108 is a resistance for controlling the electric current passing through the flash bulb 103.

Operation of this embodiment is as follows:

When flash auto-switch 105 is closed, the shutter speed, and/or aperture stop of the camera is appropriately set at the proper values for flash photography. When the main switch 106 is closed by the first incremental push-down of the shutter release button (not shown), the circuit $101(+)-104-108-105-106-101 (-)$ is closed and the indicator lamp 104 is lit. This indicates that the shutter speed and/or aperture stop is set at the proper value for flash photography. However, lamp 104 will light under these circumstances only if the flash bulb circuit is open, i.e. there is no bulb in socket 102, a bad bulb is inserted therein or a good bulb is inserted improperly. Thus, proper insertion of a good flash bulb in socket 102 closes the circuit $101 (+)-102-103-108-105-106-101 (-)$, and lamp 104 will go out. The sequence of light 104 turning on when switch 106 is closed, followed by its going out when a good bulb is properly inserted, indicates that the flash circuit is ready to operate properly. In this embodiment, the electric current passing through the flash bulb 103 is controlled by the resistance 108, and the bulb 103 is not set off. It is necessary that indicator lamp 104 have a larger internal resistance than flash bulb 103.

After the above steps are completed and light 104 is off, synchronized contact 107 is closed by means of a second incremental push-down of the shutter release button, electric current is passed through the low resistance circuit $101 (+)-102-103-$earth$ E-107-101-(-)$, and flash bulb 103 is set off.

Figure 3:
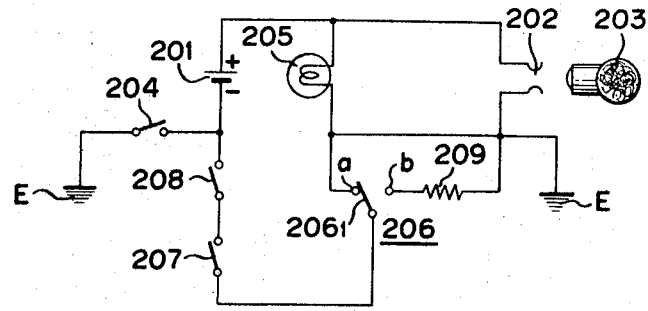
FIG. 3 is a circuit diagram showing a third embodiment of the indicator means of the camera of the present invention.

The third embodiment of the invention is illustrated in FIG. 3 and contains the following circuit elements:
   201 is a battery or other electric source for flashing;
   202 is a flash bulb socket;
   203 is a flash bulb;
   204 is a shutter synchronized contact;
   205 is an indicator lamp connected in parallel with socket 202;
   206 is a two pole switch;
   207 is a single pole flash auto-switch;
   208 is a single pole main switch; and
   209 is a resistance.

In the operation of this embodiment, when flash auto-switch 207 is closed and when the shutter release button (not shown) is pushed down by a first increment to close main switch 208, electric current is passed through the circuit 201 (+)—205—206(a)—207—208—201(−) and indicator lamp 205 is lit to indicate that the circuit is switched over to flash-photography, and the electric source is functioning.

Thereafter, when the shutter button is pushed down by the second increment, the movable contact 206$_t$ of the switch 206 is switched over to the b side, and a good bulb 203 is properly inserted into flash bulb socket 202, electric current is passed through the circuit of 201(+)—202—203—209—206(b)—207—208—201(−) and indicating lamp 205 goes off, indicating that the circuit is ready for flash photography. If lamp 205 stays lit when bulb 203 is inserted in socket 202, either the bulb or the insertion is faulty, because the operative circuit is 201(+)—205—209—206(b)—207—208—201(−). When the bulb and insertion are proper, the electric current passing through flash bulb 203 is controlled by resistance 209 and the bulb 203 is not set off. It is required that the internal resistance of indicator lamp 205 be larger than the internal resistance of the flash bulb 203. As in the embodiment of FIG. 1, switch 206 may be moved to the b position by proper insertion of bulb 203 in socket 202.

When the movement of the shutter release button is completed, the shutter synchronized contact 204 is closed, and the flash bulb 203 is set off by means of the low resistance circuit 201(+)—202—203—earth E—204—201(−).

Therefore, when the shutter speed and/or aperture stop is not correctly set at the proper value, switch 207 will be open and indicator lamp 205 is not lit when switch 208 is closed. Further, when a flash bulb 203 is not inserted into the flash socket 202, or even when the bulb 203 is inserted but it does not work because the filament is broken, or the contact of the bulb to the socket is poor, the circuit of 201(+)—205—209—206(b)—207—208—201(−) is closed, the indicating lamp 205 is again lighted, and trouble in the flash system is indicated. If indicator light 205 fails to light with switch 208 closed and switch 206 in the a position, either switch 207 is open or source 201 is dead. If indicator light 205 goes on again with switch 206 in the b position, either the bulb or its insertion is faulty. If a flash bulb is initially in socket 202 and indicator bulb 205 does not light when switches 208 and 206b are closed, nothing is indicated because switch 207 could be open or everything could be in order; the circuit should thus be initially checked with switch 206 in the a position, where closure of switch 207 is indicated by bulb 205 being lit.

In accordance with the embodiments of the present invention, the switches 6, 106, or 206 are provided so that, when interlocked with operation of the shutter release member of the camera, the fact that, at the first incremental push of the release member, it is indicated that the camera is switched over for flash photography, and at the second incremental push of the release member, the proper functioning of the flash circuit is indicated. It will be understood, however, that it is not necessary that the switch be interlocked with the shutter release member, but may be individually operated by a separate member. Further, it will be appreciated that the circuits of the invention could be contained in a separate flash gun unit with appropriate interconnections to the camera, rather than being built into the camera itself. Also, in each embodiment of the invention, the function of resistances 9, 108 and 209 is to act as an impedance means limiting the current flow so as not to set off the flash illuminator during operation of the test circuit.

The flash circuit of the present invention is not restricted to the particular embodiments illustrated and, in particular, the electric source used for illumination of the bulb can be the so called BC type, wherein a condenser is connected in parallel with the conventionally known electric source.

In accordance with the present invention, with the provision of a simple circuit and a single indicator lamp, it is possible to indicate the switch-over from the ordinary photography to flash photography, and it is also possible to indicate that the flash circuit and flash bulb are operational. With the present invention it is easily possible to confirm that everything is ready for flash photography by arranging the indicator lamp at an appropriate place in the internal portion of the camera, for example, in a portion of the view finder.

The operation of the flash auto-switch described herein is considered to be well known to those skilled in the art and not require special consideration herein. Generally, light-sensing means in the camera, for example a photo-electric cell, is connected to close the switch and set the shutter speed and/or aperture stop for flash photography whenever the incident light falls below a predetermined level. Of course other arrangements, manual or automatic, can be employed.

Various other changes in the details, steps and arrangements of parts, which have herein been described and illustrated in order to explain the nature of the invention, may be made by those skilled in the art within the principle and scope of the invention as defined in the appended claims.

I claim:
1. A flash illuminator circuit for use with a camera comprising:
   a flash illuminator receptacle, a potential source and a shutter-synchronized switch in series connection;
   a flash auto-switch adapted to be closed when said camera is set for flash photography;
   an indicator switch and indicating means in series connection with said flash auto-switch across said source whereby, upon closure of said indicator switch, closure of said flash auto-switch is indicated by activation of said indicating means; and
   means for optionally connecting said flash illuminator receptacle and an impedance means in series with said indicator switch, whereby proper insertion of a functional flash illuminator in said receptacle may be checked.

2. The circuit as claimed in claim 1, wherein operation of said indicator switch, said optional connection means and said shutter synchronized switch are controlled by the shutter release button of said camera.

3. The circuit as claimed in claim 1, wherein said indicator means is connected in parallel with said flash illuminator receptacle, and said optional connecting means connects said parallel connected indicator means and said receptacle in series with said impedance means and said source, whereby proper insertion of a functional flash illuminator in said receptacle is indicated by de-activation of said indicator means.

4. The circuit as claimed in claim 3, wherein the internal resistance of said indicator means is greater than the internal resistance of said flash illuminator.